US008457284B2

(12) United States Patent
Giersch et al.

(10) Patent No.: US 8,457,284 B2
(45) Date of Patent: Jun. 4, 2013

(54) METHOD FOR ASYNCHRONOUS COMMUNICATION BY MEANS OF AN INTERNET PLATFORM, AND INTERNET PLATFORM

(75) Inventors: Daniel Giersch, Monaco (MC); Thomas Dohmke, Reutlingen (DE); Julian Joswig, Berlin (DE); Stefan Haubold, Berlin (DE)

(73) Assignee: Quabb GmbH, Berlin (DE)

( * ) Notice: Subject to any disclaimer, the term of this patent is extended or adjusted under 35 U.S.C. 154(b) by 165 days.

(21) Appl. No.: 12/995,413

(22) PCT Filed: Jul. 1, 2009

(86) PCT No.: PCT/EP2009/004742
§ 371 (c)(1),
(2), (4) Date: Mar. 2, 2011

(87) PCT Pub. No.: WO2010/003579
PCT Pub. Date: Jan. 14, 2010

(65) Prior Publication Data
US 2011/0150192 A1 Jun. 23, 2011

(30) Foreign Application Priority Data

Jul. 9, 2008 (DE) .................. 10 2008 032 272
Sep. 10, 2008 (DE) .................. 10 2008 046 597

(51) Int. Cl.
*H04M 11/00* (2006.01)
(52) U.S. Cl.
USPC .................................... 379/88.14; 379/93.15
(58) Field of Classification Search
USPC ................. 709/206; 379/67.1, 88.12, 88.14, 379/88.17, 88.22, 88.23, 88.25, 93.17, 93.15
See application file for complete search history.

(56) References Cited

U.S. PATENT DOCUMENTS

| 6,266,692 | B1 * | 7/2001 | Greenstein | 709/206 |
| 6,301,245 | B1 * | 10/2001 | Luzeski et al. | 370/352 |
| 6,356,935 | B1 * | 3/2002 | Gibbs | 709/206 |
| 6,584,564 | B2 * | 6/2003 | Olkin et al. | 713/152 |
| 6,633,630 | B1 * | 10/2003 | Owens et al. | 379/93.24 |

(Continued)

FOREIGN PATENT DOCUMENTS

| GB | 2 367 919 | 4/2002 |
| WO | WO 01/13576 | 2/2001 |
| WO | WO 01/88723 | 11/2001 |

OTHER PUBLICATIONS

International Search Report issued in PCT/EP2009/004742 mailed Sep. 11, 2009.

*Primary Examiner* — Olisa Anwah
(74) *Attorney, Agent, or Firm* — Lempia Summerfield Katz LLC

(57) ABSTRACT

The invention relates to a method for asynchronous communication by means of an internet platform (2), wherein registered users of the internet platform (2) can receive mail by means of the internet platform (2), wherein the mail is transmitted for at least part of the postal path thereof in electronic form by means of the internet and the internet platform (2), and further relates to an internet platform (2). In order to provide the users (N) expanded communication capabilities and a greater level of comfort, according to the invention, one of a plurality of presettable transmission paths is preset by the users (N) on the internet platform (2), said paths including the transmission of the mail as a letter, as a fax, and as electronic mail, and the transmission of the mail to the users (N) is performed or initiated by the internet platform (2) according to each preset transmission path.

17 Claims, 1 Drawing Sheet

U.S. PATENT DOCUMENTS

| | | | |
|---|---|---|---|
| 6,978,378 B1* | 12/2005 | Koretz | 713/193 |
| 7,483,956 B2* | 1/2009 | Denney et al. | 709/215 |
| 7,730,321 B2* | 6/2010 | Gasparini et al. | 713/182 |
| 2003/0095643 A1* | 5/2003 | Fortman et al. | 379/88.14 |
| 2004/0044734 A1 | 3/2004 | Beck | |
| 2008/0123850 A1* | 5/2008 | Bhatnagar et al. | 380/259 |

* cited by examiner

METHOD FOR ASYNCHRONOUS COMMUNICATION BY MEANS OF AN INTERNET PLATFORM, AND INTERNET PLATFORM

RELATED APPLICATION DATA

This U.S. national phase application is based on international application no. PCT/EP2009/004742, filed on Jul. 1, 2009, which claimed priority to German national patent application 10 2008 032 272.5 filed on Jul. 9, 2008 and German national phase application 10 2008 046 597.6 filed on Sep. 10, 2008. Priority benefit of these earlier filed applications is hereby claimed, and the full disclosures of these earlier filed applications are hereby incorporated by reference herein.

BACKGROUND

1. Field of the Disclosure

The invention is directed to a method for asynchronous communication through an internet platform and to an internet platform.

2. Description of the Related Art

Internet platforms, for example MySpace, Facebook, Studi-VZ or Schüler-VZ, which can also be called social networks, are very popular, especially with young users. On these internet platforms, the users can create pages with user profiles, which contain information, for example, about friends, interests, hobbies, etc., of the user, in the form of text, photos, videos or similar. Moreover, the users who are registered in one of these platforms can communicate through the platform both synchronously and asynchronously with one another, whereby in the first case the communication usually takes place either as instant messaging between two on-line users by exchange of text messages (chat), speech (audio chat) or images (video chat), and in the latter case (that is, asynchronously), usually by email (email) between an on-line and an off-line user.

However, the known internet platforms do not fulfill all requirements that are desired by the user of the platform.

First of all, the above-mentioned possibility of asynchronous communication by email with other users of the internet platform represents only a part of all the known communication possibilities that furthermore includes the sending of messages or mail in the form of letters, faxes or text messaging or the transmission of spoken messages.

Further, internet platforms aim to collect as many registered users on their platform as possible and therefore do not allow asynchronous communication with nonusers through the internet platform, that is, with natural persons, companies, organizations, associations or other institutions that are not registered on the internet platform.

However, this means that the users of the internet platform who would like to use a communication means other than email or who would like to communicate asynchronously with a nonuser by sending or receiving mail, must leave the platform and must carry out the communication using a communication pathway that is different and separate from the platform.

Moreover, in the case of the known internet platforms, it is regarded as a disadvantage that users may register on the platform with a false identity for the purpose of misuse, for example, in order to obtain information about other users. The same also applies to email addresses, behind which fundamentally a completely different person can hide than the person named in the address.

SUMMARY

Based on this, the task of the invention is to improve a method and an internet platform of the type outlined at the outset so that the user will be offered extended communication possibilities and greater comfort and preferably also better protection against the misuse by third parties.

In order to solve this task, in the method according to the invention, it is provided that by the users on the internet platform one of several presettable transmission paths is preset, which include at least the transmission of mail as letter, as telefax and as email and that the transmission of the mail to the user, at least when the mail originates from other users, is performed by the internet platform corresponding to the particular preset transmission path or is initiated.

For this purpose, in the internet platform according to the invention, a preset transmission path is stored in the server for each user, which determines the path of the transmission of the mail to the user and which can be selected by the user from several presettable transmission paths, which include at least the physical transmission of the mail as a letter through a delivery service, the transmission of the mail as telefax through a public telephone network and transmission of the mail as email through the internet or internet platform, respectively.

Within the framework of this invention, the term "mail" is understood to mean communications or messages, which can be sent electively as letter, telefax, email or also as SMS or as voicemail, especially text communications or text messages. However, moreover, the mail may also contain pictures or videos which are present in the form of files on that part of the postal path on which the mail is sent in electronic form through the internet and the internet platform.

An especially preferred embodiment of the invention provides that the presetting of the transmission path is performed by the user who receives the mail so that, in contrast to the known mail transmission systems, it is not the sender but the receiver who decides about the path or the type of transmission of his mail.

This makes it possible for each user to adjust the mail transmission path according to his personal preferences and according to the communication paths or communication means that are available to the user or accessible to him at various locations.

For example, a user who prefers reading printed mail can generally choose the transmission path of letter or telefax. However, it is possible for him to change the selected presetting to email, for example, during a holiday, to receive mail through a computer at his hotel or an internet café by accessing his mail as needed from his mailbox in the server. The change can be made in advance by presetting different transmission paths for the desired time periods using a calendar function.

In addition to the transmission paths already mentioned, namely letter, telefax and email, the transmission paths that can be preset by the user may also include the transmission of the mail as SMS or as voicemail to telephone equipment of the user, preferably to a cell phone.

Besides the transmission path, each user can also preset the delivery type, that is, the type of delivery of the mail as registered, express or similar. As another option of the type of delivery, a so-called letter sharing can be preset in which several letters are deposited at a predetermined time period, for example, one day, to a common recipient from different senders in a letter-producing station of the internet platform, inserted into a single envelope and sent on to the mail delivery service in this form, which provides great advantages from the point of view of minimization of cost and environmental impact.

A preferred embodiment of the method according to the invention provides that, in the course of the enrollment of a user on the internet platform, the presentation of an official identification document is required for identification of the user in order to prevent improper use of the internet platform under a false name. Then the user is given an address which, for example in the case of natural persons, can be the last name and first name specified in the identification document, and in the case of companies, associations or other institutions, can contain the name that is in the presented identification document, for example, an excerpt from the commercial register, association register, etc., so that for each other user it is already apparent from the address whom the user is dealing with.

Since this applies only to registered users of the internet platform, email received from internet platform users is expediently handled differently than the email from nonusers. Preferably, the email of users is provided on a standard basis with a signature, which ensures that the mail originates from the person named as sender and was not improperly sent from a third party under the name of the sender. Moreover, preferably it is ensured with a code included in the mail that can be checked by the recipient, that the content of the mail was not altered after sending.

The different treatment of email of users and nonusers makes it necessary for the internet platform to recognize if the received email originates from a user or from a nonuser. In order to make such recognition possible, email sent by users through the internet platform is preferably not sent to the standard SMTP connection of the internet platform but to another connection which is preset by the user of the internet platform, according to the guidelines of the internet platform, in the email program used by them.

In connection with a password set by the user during the presetting of the other connection, the internet platform can determine with certainty if the incoming email originates from a user or from a nonuser.

While an email originating from a user is filed after providing it with a signature as safe mail in a mailbox of the recipient, incoming email according to the presettings of the recipient is expediently blocked entirely or after previous spam-filtration is filed in a "quarantine folder" of the mailbox.

In order to block the mail of nonusers, each user can preset a blocking function which blocks email from nonusers generally or allows it for nonusers who are known by name. In this way the sending of spam mail can be prevented effectively, since the origin of each sent mail can be followed back to a sender who is known by name, who, as long as is a user of the internet platform, can be excluded as user in case of improper usage.

The email arriving at the internet platform is preferably filed in a mailbox on the server of the internet platform, where it remains and is managed. That is, when opened by the user, the mail is not downloaded to the user's terminal, so that even after opening the mail access from another terminal of the user is possible. In this way the mobile communication ability of the user is improved, since the mail in the mailbox can be accessed from various terminals, such as a PC, a notebook and a mobile telephone.

The incoming email is stored in the mailbox as a dataset, which, in addition to the communication and the topic, also contains the addresses of the recipient and of the sender.

When the user presets the transmission path as email, the dataset remains stored in the mailbox from where it can be recalled by the recipient and can be displayed on the screen of the particular terminal equipment as a message.

When the user sets the transmission path of letter or telefax, the dataset is converted into a data file with a printable or telefaxable data format. In addition to the content of the message, the data file also contains the addresses of the recipient and of the sender, which later will be introduced at a predetermined location into the letter or the telefax.

In addition to the above data, the dataset can preferably be complemented additionally by personalized advertisement, which relates to interests indicated by the recipient in his user profile and, at the request or agreement of the recipient, can, with remuneration, be introduced into the mail of the recipient, whereby for example, in the case of transmission of the mail as letter can be printed together with the message on the message sheet or alternatively on the envelope that encloses the message sheet.

For transmission as a letter, the printable data file is transmitted to a printer of a letter-producing station of the internet platform and there printed on the message sheet. After folding and enclosing the sheet in an envelope, a postage stamp is affixed to the resulting letter and sent to the recipient via a mail delivery service.

For transmission as telefax, the telefaxable file is transmitted by a telefax creating unit or SMS creating unit of the internet platform as telefax or SMS through a public telephone network, to a telefax machine or mobile telephone of the recipient.

Since the costs for the transmission of the mail, as in the case of transmission by conventional mail delivery systems, are borne by the sender, an advantageous embodiment of the invention provides that the transmission path preset by each user is displayed to other logged-in users as soon as they would like to send mail to the user via the internet platform. In addition to the transmission path and, if provided, a preset delivery type, the display preferably also shows the costs due for the transmission and delivery.

Since in the case of letters the cost of the transmission usually depends on the weight of the sent material, preferably a cost-calculator is used that calculates during or after the preparation of the communication based on extent of the communication and other settings of the sender such as size of print and formatting of the communication, the weight of the letter, the resulting costs of the communication. This offers the sender the possibility of minimizing the costs and environmental impact by selecting, for example, a smaller font size or two-sided printing.

BRIEF DESCRIPTION OF THE DRAWINGS

The invention will be explained in more detail below with the aid of a practical example shown in the drawing. The following are shown.

DETAILED DESCRIPTION OF THE DISCLOSURE

Figure 1:
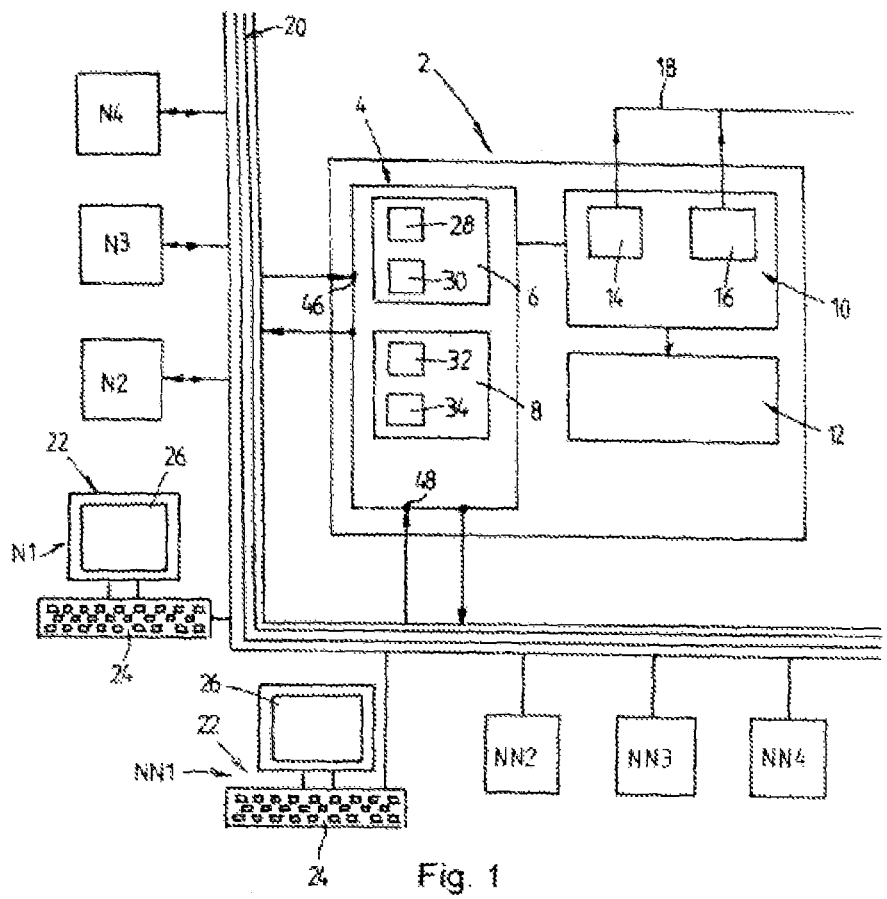
FIG. 1 is a block diagram of an internet platform according to the invention.

The internet platform 2 shown in the drawing comprises at least one server 4 with one or several databases 6, 8, a processing computer 10 that is connected to the server 4, a letter-producing station 12 that is controlled by computer 10 as well as a telefax-producing unit 14 and an SMS-producing unit 16, which are both integrated into the processing computer 10 and are connected to a public telephone network 18.

As shown in FIG. 1, the internet platform 2 is used by a large number of registered users N1, N2, N3, N4 . . . , who can be natural persons, companies, associations, organizations, etc. The users N1, N2, N3, N4 . . . can access the platform 2 through the internet 20 and can communicate with one another through platform 2, asynchronously and synchronously. Moreover, the users N1, N2, N3, N4 . . . can communicate through the internet platform 2 and the internet 20 can also communicate asynchronously with nonusers NN1, NN2, NN3, NN4 . . . who again can be natural persons, companies, associations, organizations, etc., but who are not registered at the internet platform 2.

As shown in FIG. 1 enlarged on the example of a user N1 and a nonuser NN1, the communication with the internet platform 2 in both cases is through PCs or other suitable terminals 22, which are provided with a keyboard 24 for entering text passages and a display 26, as well as possibly other peripheral equipment.

For the acceptance of a new user N, this user enrolls first from a suitable terminal 22 on internet platform 2 and leaves his name and address or addresses as well as telephone numbers from one or several fixed network and/or mobile telephone connections as well as telefax connections, to the extent available. After enrollment, the operators of the internet platform 2 assign a mailbox to the user N in a mailbox list 28 in one of the databases 6, 8 and send to the user the access data for the mailbox after the identity of the user N has been checked with the aid of an identification document. The mailbox is assigned an address which contains the name of the user given in the identification document and is filed in a user or address list 30 in one of the databases 6, 8 that is accessible to all users N1, N2, N3, N4 . . . . In the case of an enrollment of a user N with an already-issued name, this name is provided with a supplement. Thus, to each mailbox a person can be assigned who can be identified unequivocally by the operators of the internet platform 2 and by the other users N1, N2, N3, N4 . . . . The address of the mailbox of each user N always remains the same even when the user N changes his address or company location.

After allocation of a mailbox, besides the address, the user N can set up a user profile using a predetermined input mask in which, in addition to the address and name that are already contained in it, among other things, he can enter his street address or street addresses, the telephone numbers of his land line and cell phone and telefax connections provided that they are available. In addition to these data the user profile may contain a large number of other data which the user N would like to make available to other users N1, N2, N3, N4 . . . , for example, the photo of user N, personal data such as profession, education, interests and similar. The data in the user profile set up by the user are linked to the address of the mailbox of the user in one of the databases 6, 8 and stored in a user profile list 32 and are available to the other users N1, N2, N3, N4 . . . of the platform 2, for example through a search function.

Furthermore, the input mask contains an input field with which the user N can select various presets. One of these presets concerns the transmission path of the mail sent to the user through the internet platform 2, whereby as possible alternatives for the transmission paths, transmission as email, as physical letter, as telefax or as SMS is possible. Moreover, optionally further pathways can be provided for transmitting the mail, for example transmission as voicemail to a cell phone of the user.

To the extent that the user N does not choose a transmission path, the mail is transmitted to the user N as a letter until a change is made, since this transmission path is set as the standard [default] until a change is made by the user N. The preset transmission path, together with the other data of the user, is stored in his user profile and can be changed again by the user N at any time.

Another preset that the user N can make concerns the possibility of the blocking of emails that are sent through the internet platform to the address of the user N by nonuser NN, and whose transmission to user N can be prevented globally with the aid of a corresponding presetting of the blocking function.

After the enrollment or registration of user N at the internet platform, the user N can both receive and send mail through the internet platform 2.

Below, the processing of mail by the internet platform 2 is described, using as example mail that was either sent by another user N1, N2, N3, N3, N4 . . . or by a nonuser NN1, NN2, NN3, NN4 . . . and is to be transmitted to user N, whereby the user N1, N2, N3, N4 . . . or nonuser NN1, NN2, NN3, NN4 . . . who sends the mail is generally designated sender and the user N to whom the mail is to be designated as recipient.

Since an internet platform 2 can only receive and further transmit mail that has been submitted in electronic form, the sender must prepare the mail electronically and transmit it to the internet platform 2 in the electronic form.

When the sender and the receiver are users N of the internet platform 2, the sender can transmit the mail for further transmission to the receiver in the electronic form through a safe SSL connection directly to platform 2, while he is logged on to it. In this case he prepares the mail as a text message to his terminal 22 which communicates through the internet 20 with platform 2 and selects the address of the user that is the intended recipient from a database 6, 8 of the user and from the address list 30 stored in the server 4. With the selection of the address, the preset transmission path will be recalled automatically from the user profile list 32 and displayed to the sender of the mail together with the cost associated with this path on the display 26.

The costs for a transmission as letter, for example, are determined in this way: after a the reformatting of the text message into a data format that is suitable for printing as a letter, for example a pdf file, the number of pages and thus the weight of the resulting letter are calculated based on the length of the communication, which, together with the address of the recipient stored in the user profile, form the basis for the calculation of the costs.

If the sender agrees to the cost and sends the mail by a corresponding input on keyboard 24 of his terminal 22, the transmission path preset by the recipient together with the recipient name, the subject and the text communication are combined into a dataset and this dataset is sent to the internet platform 2 via the secure SSL connection.

When this dataset is received at the internet platform 2, on a standard basis, it is provided with a signature by server 4 from which the recipient will recognize the sender of the mail in addition to the address. Besides this signature, a coded checking number is introduced into the dataset, which permits checking the authenticity of the sender of the mail and its contents by the recipient. Then the dataset is stored in one of the databases 6, 8 of the server 4 as received mail in a received mail list 34.

In cases in which the user in his user profile declared at least one area of interest and indicated agreement to receive advertisements related to the area of interest, the server 4, upon retrieval of the user profile of the recipient, can insert person-related advertising into the dataset, which is stored in one of the databases 6, 8 and when needed can be retrieved for this purpose and linked to the dataset.

The datasets stored as received mail in one of the databases 6, 8 of the server 4 are retrieved and examined by the processing computer 10 at regular intervals in order to determine the transmission path filed in each dataset.

Where in the dataset email is given as the transmission path, the receipt of the communication in the mailbox of the recipient is displayed so that the recipient can retrieve the communication on the screen 26 of his terminal 22. In this case, the processing computer 10 is no longer active.

Where, in the dataset, letter is given as the transmission path, the processing computer 10 removes the entire dataset from the server 4 and automatically produces from the text message a file that is suitable for printing as letter, for example a pdf file. Hereby computer 10 attaches to this file automatically the address of the recipient taken from the record, which is introduced into a predetermined address field, and with the subject taken from the record, which is then introduced into a predetermined subject field, it then sends the entire file to the letter-producing station 12.

Figure 2:
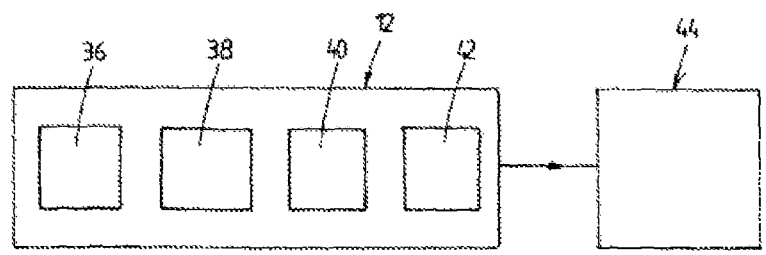
FIG. 2 is a block diagram of a letter-producing station of the internet platform.

As shown in FIG. 2, the letter-producing station 12 comprises a printer 36 with which the record is printed out on one or several sheets depending on the length, a folding machine 38 for automatic folding of the printed sheets, an envelope machine 40 for automatic enveloping of the folded sheets, as well as a postal meter 42 for applying postage to the finished enveloped letters, which are then delivered to the particular recipient by a mail delivery 44.

Where in the dataset the transmission path is indicated to be telefax, the processing computer 10 extracts the entire record from the incoming mail of the database 6, 8 of the server 4 and from the text message automatically produces a file that is suitable to be sent as telefax, for example a pdf file, to which it adds, as previously described, the address of the recipient, the address of the sender and the subject and then through the integrated telefax-producing unit 14 and the public telephone network 18 transmits it to the telefax connection of the recipient.

Where in the dataset SMS is given as the transmission path, again the process computer 10 collects the entire dataset from the incoming mail. Then from this dataset the processing computer 10 automatically produces a short communication suitable to be sent as SMS, which contains only the sender and the subject of the text message. This brief communication is sent by the SMS-producing unit 16 integrated in the processing computer 10 through the public telephone network 18 to the cell phone of the recipient.

Regardless of the preset transmission path, the mail, that is, the dataset produced by the sender, is also stored and managed in one of the databases 6, 8 of the internet platform 2, so that it can be retrieved as received mail from the mailbox of the recipient and can be retrieved as outgoing mail from the mailbox of the sender and, if needed, for example in the case of loss of a letter, it can be read again, further transmitted, deleted or sent again by the sender to the same recipient or to other recipients, as desired.

Even where the recipient has chosen transmission of the mail through the path of letter or telefax, this provides the sender of a communication the possibility of complementing the communication by an image or video sequence, which can be retrieved by the recipient from his mailbox, after, he has been informed, through a corresponding indication in the letter or in the telefax, for example by an image from the picture or video sequence, that the mailbox contains an image or video sequence that is ready to be retrieved.

Moreover, each user by a corresponding preset in the user profile can choose how and whether he would like to be informed about the transmission of the mail through the selected transmission path. If the user chooses telefax or letter as the transmission path, he can be informed about the receipt of mail, for example, by SMS or by email, so that checking the fax machine or the mailbox is no longer necessary.

Where the communication is to be complemented with advertising, in case the transmission is by letter or telefax, this is inserted at a desired location of the printout, for example, on the back side of the letter or the telefax, on the envelope, on a predetermined advertising field which advantageously is visible through an additional viewing window in the envelope, or is made prominent in the continuous text of the communication with color. When the communication is sent as an email, then the ad is displayed together with the communication on screen 26 in a predetermined advertising field.

Independently of the nature of the transmission, the completed sending of the mail is confirmed to the sender of the communication. For this purpose, the processing computer 10 contacts the server 4 and deposits in one of the databases 6, 8 a confirmation of sending, which is displayed in the mailbox of the sender. At the same time, the account of the sender is charged with the cost of the transmission and delivery, if required.

When mail is transmitted as email, the confirmation of sending includes not only the transmission path and the confirmation of receipt, but also other information, such as the time and duration of the retrieval of the email by the recipient, as well as information, for example, as to whether an attachment of the email has been opened, if other pages besides the first page were read and if the recipient has clicked on a link included in the mail.

When the sender and the recipient are users N of the internet platform 2, but the sender is not at that particular time logged in to the internet platform 2, the mail can be produced with the aid of an arbitrary email program that is used by the sender as a local mail client, for example Microsoft Outlook, Mozilla Thunderbird, etc. and then sent on to the internet platform 2 for further transmission to the recipient.

For this purpose, the sender presets already during his registration as user N in the internet platform 2 that the sending of email through the internet platform 2 to other users N should not be sent to the standard SMTP connection 46 of the internet platform 2, but to another connection 48, the number of which is preset for this purpose by the internet platform 2. Moreover, in this setup the sender presets that the sending be done through an SSL connection and the sender chooses a password which is inserted into the email that is sent to the internet platform 2 for transmission to a user N.

When therefore email is received at internet platform 2 through connection 48 and the password agrees with the password selected by the sender during the setup, it is ensured unequivocally that the mail is mail from the user N named as sender. In this case the mail is processed and transmitted by the internet platform 2 in essentially the same way as it was described above for the transmission of the mail of a logged-in sender.

However, differences exist in that the transmission path preset by the recipient including the costs for transmitting the mail as letter, telefax or SMS via the preset transmission path are communicated to the sender in the form of a response email produced automatically by the internet platform 2 and a confirmation is requested that the transmission of the mail should occur through the transmission path requested by the recipient, for example, as a letter.

Where the mail is to be provided as an SMS, the sender will also be asked, as appropriate, to change or correct the SMS generated by the internet platform 2 from the contents of the message, as necessary, with consideration of certain predetermined conditions, such as the maximum number of characters, etc.

As soon as the confirmation of the sender arrives at the internet platform 2, from the content of the mail or of the generated and optionally modified SMS, as well as information taken from the sender and recipient inputs and the transmission path preset by the recipient, again a dataset is produced, which is then stored in the received mail listing 34 in one of the databases 6, 8 of the server 4 as received mail.

When the email enters at the standard SMTP connection 46 of the internet platform 2 and/or the password does not agree with the password entered by the sender during the change of the setting, the mail is not a secure mail from a user N, so that this mail is treated by the internet platform 2 differently than mail originating from other users N of the internet platform 2.

When such an email is received at internet platform 2, first it is checked as to whether the recipient has preset the previously-described blocking function. If this is the case then further transmission of the mail into the mailbox of the recipient is blocked for all senders with the exception of senders approved by the recipient. Otherwise, after previous spam filtering, the mail is deposited in a quarantine folder of the mailbox, where it is clearly recognizable by the recipient as a potentially unsafe mail and if needed can be recalled.

For the receipt of email from nonusers NN, the users N have the additional possibility in their user profile to preset the option of collection service. When a user N chooses this possibility for other web-based email mailboxes which he maintains with other providers, the entire email from these mailboxes is deposited automatically at predetermined time intervals in the mailbox of the recipient at internet platform 2 and optionally it is placed in separate folders there.

The invention claimed is:

1. Method for asynchronous communication through an internet platform in which registered users of the internet platform can receive mail, whereby the mail is transmitted in an electronic form through the internet and the internet platform, at least on part of its mailing route, wherein one of several presettable transmission paths is preset by the users on the internet platform, including at least the transmission of the mail as a letter, as telefax and as email, and that the transmission of the mail from the internet platform to the users is performed or initiated corresponding to the particular preset transmission path, the method further including checking as to whether the mail received at the internet platform originates from other users of the internet platform or from nonusers, wherein the mail originating from other users of the internet platform is authenticated by insertion of a test code produced from the content of the mail and by comparing the test code with a reference code produced by a recipient in the same way.

2. Method according to claim 1, wherein the presetting of the transmission path is done by the user who receives the mail.

3. Method according to claim 1, wherein the presettable transmission paths further comprise the transmission of the mail as SMS on telephone equipment of the user.

4. Method according to claim 1, wherein the presettable transmission paths also include the transmission of the mail as voicemail on telephone equipment of the user.

5. Method according to claim 1, wherein the mail originating from other users of the internet platform is transmitted as email through a safe connection to the internet platform.

6. Method according to claim 1, wherein the mail originating from other users of the internet platform is provided with a signature with the aid of an automatic signature process.

7. Method according to claim 1, wherein mail arriving at the internet platform as email is stored and managed on a server of the internet platform.

8. Method according to claim 1, wherein email sent by users can optionally be sent directly through the internet platform or indirectly through a local email program and the internet platform using a safe connection.

9. Method according to claim 1, wherein during the course of an enrollment of a new user at the internet platform, an identification of the user is performed by presentation of an official identification document.

10. Internet platform with means for asynchronous communication, which, in the case of users registered at the internet platform, allow a receipt of mail through the internet platform from other users of the internet platform and from nonusers, the internet platform comprising at least one server that can be connected to terminals of the users, wherein a preset transmission path for each user is stored in a database in the server, which establishes the path of transmission of the mail to the user and can be selected by the user from several presettable transmission paths, which include at least the transmission of the mail as a letter, as telefax and as email, wherein the internet platform further comprises different connections for the receipt of email from users and nonusers, respectively, and wherein the at least one server is configured to automatically authenticate mail originating from other users of the internet platform by inserting a test code produced from the content of the mail and by comparing the test code with a reference code produced by the recipient in the same way.

11. Internet platform according to claim 10, wherein the transmission path selected as a preset by the user is stored for the mail directed to the user in a user profile of the user.

12. Internet platform according to claim 10, wherein a device is connected to the server via a computer for printing, enveloping and applying postage to mail as letters.

13. Internet platform according to claim 10, further comprising a device for sending mail as telefax through a device that communicates through a computer with the server and is connected to a public telephone network.

14. Internet platform according to claim 10, further comprising a device for sending mail as SMS through a device that communicates through a computer with the server and is connected to a public telephone network.

15. Internet platform according to claim 12, wherein mail entering the computer and stored in the database of the server is recalled regularly and the transmission path of the mail is determined and that the computer activates one of the devices corresponding to the determined transmission path.

16. Internet platform according to claim 10, further comprising a cost calculator for calculating the cost of transmission through the preset transmission path.

17. Internet platform according to claim 10, further comprising means for automatically signing mail originating from other users of the internet platform.

* * * * *